Aug. 20, 1946.　　　J. B. JENNI　　　2,406,149
SCREW DRIVER
Filed Feb. 17, 1944

Inventor
Jesse B. Jenni

By Clarence A. O'Brien
and Harvey B. Jacobson
Attorneys

Patented Aug. 20, 1946

2,406,149

UNITED STATES PATENT OFFICE 2,406,149

SCREW DRIVER

Jesse B. Jenni, Festus, Mo.

Application February 17, 1944, Serial No. 522,805

2 Claims. (Cl. 145—66)

This invention relates to new and useful improvements in tools and more particularly to a rack and gear operated tool for working in close quarters.

The principal object of the present invention is to provide a tool which can be operated by reciprocatory movement of a rack against a gear, wherein the rack is rotatable so as to be engageable and disengageable with the gear, thus dispensing with more complicated and expensive rack disengaging means.

Other objects and advantages of the invention will become apparent to the reader of the following description.

Figure 1:
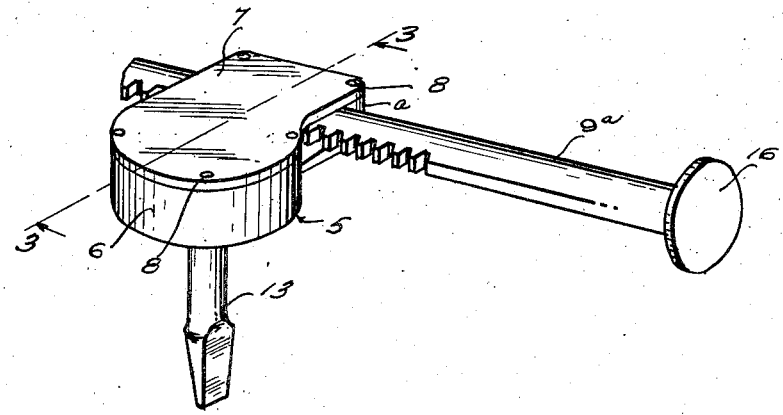
Figure 1 is a perspective view.

Referring to the drawing wherein like numerals designate like parts, it can be seen that numeral 5 denotes a gear housing consisting of a lower hollow body 6 and a cover plate 7, secured to the body 6 by screws or the like 8. The body 6 and also the cover 7 has a laterally disposed portion $a$ having a passageway 9 therethrough and through this passageway is disposed an elongated bar 9a having a rounded portion $b$ and a substantially tapered portion $c$ and in the latter are rack teeth 10. The passageway 9 flares inwardly as at $d$.

The housing 5 has a rounded portion in which is located a gear 11 having a square opening at its center for receiving the squared end 12 of a screw driver or the like 13 which extends into the housing 5 through an opening 14 in the bottom of the housing section 6.

Figures 2, 3:
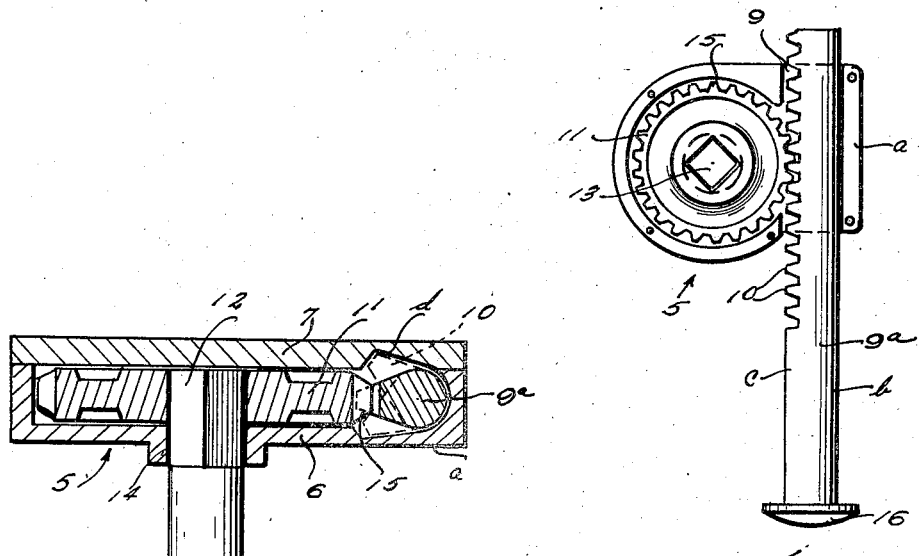
Figure 2 is a top plan view with the cover removed.
Figure 3 is a section on the line 3—3 of Figure 1.

The teeth 15 of the gear 11 are beveled as shown in Figure 3 and obviously by rotating the rack bar 9a by a handle 16 it has at one outer end, the teeth 10 of the rack bar can be disengaged from the teeth 15 of the gear 11.

For instance, assuming that the rack bar 9a has been pulled toward the mechanic to its fullest extent and it is desired to replace the rack bar to repeat this pull without disturbing the tool 13. All that is necessary is to rock the rack bar 9a so that its teeth 10 disengage from the teeth 15 of the gear 11 and the rack bar 9a can be pushed through the laterally disposed portion $a$ of the housing without disturbing the gear 11 and when the rack bar has been thus returned to its starting position, it can be given a slight turn to mesh its teeth 10 with the teeth 15 of the gear 11 so that the tool 13 will be rotated and the rack bar is again pulled.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A tool of the character described comprising a housing, a gear in the housing, said housing having a guide portion having an opening therein adjacent the periphery of said gear, through which the teeth of the gear extend, a rack bar disposed through the guide portion and engaged by said gear, a tool projecting from the gear, said rack bar being rotatable to engage or disengage its teeth with the teeth of the gear, said guide portion and said rack bar being of non-circular cross section to limit rotation of the rack bar when disengaging from the gear.

2. A tool comprising a housing, a gear enclosed in the housing, a rotatable tool bit detachably journaled in said housing and detachably connected to said gear, said tool bit constituting the sole journaling means for said gear during use of the device, a guide portion in said housing adjacent the periphery of said gear, a rack bar slidably and removably received in said guide portion and normally engaging the teeth of said gear, said rack bar being rotatable in said guide portion to engage or disengage its teeth from the teeth of the gear, said rack being of oval shape in cross section and said guide portion having rotation limiting surfaces cooperating with said rack limiting rotation thereof when disengaging said rack from said gear.

JESSE B. JENNI.